United States Patent
Cho et al.

(10) Patent No.: US 8,215,668 B2
(45) Date of Patent: Jul. 10, 2012

(54) VEHICLE

(75) Inventors: Yeong Gi Cho, Seongnam-si (KR); Yeon Kyeong Kim, Gangnam-gu (KR); Gun Woo Kim, Seongnam-si (KR)

(73) Assignee: Hyundai Mobis Co., Ltd., Yongin-si, Gyeonggi-do (KR)

( * ) Notice: Subject to any disclaimer, the term of this patent is extended or adjusted under 35 U.S.C. 154(b) by 289 days.

(21) Appl. No.: 12/628,021

(22) Filed: Nov. 30, 2009

(65) Prior Publication Data

US 2011/0057427 A1 Mar. 10, 2011

(30) Foreign Application Priority Data

Sep. 7, 2009 (KR) .................... 10-2009-0084174

(51) Int. Cl.
*B60R 21/30* (2006.01)
*B60R 21/16* (2006.01)

(52) U.S. Cl. .............. 280/736; 280/743.2; 280/739

(58) Field of Classification Search .......... 280/736, 280/737, 728.1, 730.1, 731, 732, 739, 742, 280/743.1, 743.2, 730.2; 701/45; 180/271, 180/290

See application file for complete search history.

(56) References Cited

U.S. PATENT DOCUMENTS

| | | | | |
|---|---|---|---|---|
| 3,887,213 A * | 6/1975 | Goetz | .................. | 280/738 |
| 5,924,721 A * | 7/1999 | Nakamura et al. | ......... | 280/730.2 |
| 5,927,750 A * | 7/1999 | Nakamura et al. | ......... | 280/730.2 |
| 5,987,370 A | 11/1999 | Murphy et al. | | |
| 6,142,517 A * | 11/2000 | Nakamura et al. | .......... | 280/739 |
| 7,475,904 B2 * | 1/2009 | Hofmann et al. | ............. | 280/739 |
| 7,695,003 B2 * | 4/2010 | Feller et al. | ................ | 280/730.2 |
| 7,712,779 B2 * | 5/2010 | Kim | ................ | 280/739 |
| 7,770,917 B2 * | 8/2010 | Henderson et al. | ........ | 280/730.2 |
| 7,988,188 B2 * | 8/2011 | Zauritz et al. | ............. | 280/730.2 |
| 2002/0113416 A1 * | 8/2002 | Uchida | ........................ | 280/729 |
| 2005/0184493 A1 * | 8/2005 | Hofmann et al. | ......... | 280/730.2 |
| 2007/0057492 A1 * | 3/2007 | Feller et al. | ............... | 280/730.2 |
| 2007/0187932 A1 * | 8/2007 | Sekizuka | ................... | 280/730.1 |
| 2007/0273133 A1 * | 11/2007 | Zauritz et al. | ................ | 280/742 |
| 2008/0023945 A1 * | 1/2008 | Zauritz et al. | ................ | 280/729 |
| 2009/0014989 A1 * | 1/2009 | Henderson et al. | ........ | 280/730.2 |
| 2011/0057427 A1 * | 3/2011 | Cho et al. | ...................... | 280/736 |
| 2011/0062692 A1 * | 3/2011 | Yamane | ....................... | 280/739 |
| 2011/0148085 A1 * | 6/2011 | Fukawatase et al. | ......... | 280/736 |
| 2011/0198828 A1 * | 8/2011 | Fischer et al. | ............. | 280/743.2 |
| 2011/0260431 A1 * | 10/2011 | Kwon | ........................ | 280/730.1 |

FOREIGN PATENT DOCUMENTS

| | | |
|---|---|---|
| KR | 10-0286529 | 4/2001 |
| KR | 10-2008-0008460 | 1/2008 |
| KR | 10-2008-0112001 | 12/2008 |

* cited by examiner

*Primary Examiner* — Faye M Fleming
*Assistant Examiner* — Karen A Beck
(74) *Attorney, Agent, or Firm* — Sherr & Vaughn, PLLC

(57) ABSTRACT

Disclosed is a vehicle including a seat on which a passenger may be seated; an airbag cushion that is expanded according to an inflow of a gas to protect the passenger seated on the seat; an inflator that introduces the gas into the airbag cushion; a first vent hole provided at the airbag cushion to exhaust therethrough the gas introduced from the inflator; a second vent hole provided at the airbag cushion to face the passenger to exhaust therethrough the gas introduced from the inflator; and a vent amount adjustment member connected to the second vent hole to adjust the amount of the gas exhausted through the second vent hole depending on whether an adult is seated on the seat or a child restraint system is installed on the seat.

8 Claims, 6 Drawing Sheets

VEHICLE

This non-provisional application claims priority under 35 U.S.C. §119(a) on Patent Application No. 10-2009-0084174 filed in Republic of Korea on Sep. 7, 2009, the entire contents of which are hereby incorporated by reference.

BACKGROUND OF THE INVENTION

1. Field of the Invention

The present invention relates to a vehicle, especially which may change the inner pressure of an airbag cushion depending on an object to be seated on a seat.

2. Discussion of the Related Art

In general, a vehicle is provided with an airbag. Upon a vehicle accident, a gas is introduced from an inflator into the airbag so that the airbag cushion included in the airbag is expanded, thus protecting a passenger.

Airbags are installed on parts of the vehicle as necessary; for example, an airbag for driver is installed in the steering wheel to protect the driver seated on the driver seat, an airbag for passenger in the glove box to protect a passenger seated on the passenger seat, a curtain airbag along a loop rail to protect a side of a passenger, and so on.

Upon a vehicle crash, a gas generating material contained in the inflator of the airbag is exploded to generate a gas, which in turn flows into the airbag cushion, whereby the airbag cushion is expanded to protect the passenger.

An excessive inner pressure of the airbag cushion may cause the passenger to be injured. Therefore, each country has different standards as to the inner pressure of the airbag cushion, i.e. the degree of expansion of the airbag, depending on whether an object to be seated is an infant under 1 or 3, a child under 6, or an adult. To satisfy the standards, it has been suggested to provide a sensor that may identify a passenger seated on the seat, or adjust the amount of gas exhausted through vent holes provided at the airbag cushion.

SUMMARY OF THE INVENTION

An aspect of the present invention provides a vehicle that relatively raises the inner pressure of the airbag cushion when an adult is seated on the seat to protect the adult by an appropriate inner pressure, and relatively lowers the inner pressure of the airbag cushion when a child restraint system is installed on the seat to prevent an infant under age 1 or 3, or a child under age 6 from being injured due to expansion of the airbag cushion.

In accordance with an aspect of the present invention, there is provided a vehicle including: a seat on which a passenger may be seated; an airbag cushion that is expanded according to an inflow of a gas to protect the passenger seated on the seat; an inflator that introduces the gas into the airbag cushion; a first vent hole provided at the airbag cushion to exhaust therethrough the gas introduced from the inflator; a second vent hole provided at the airbag cushion to face the passenger to exhaust therethrough the gas introduced from the inflator; and a vent amount adjustment member connected to the second vent hole to adjust the amount of the gas exhausted through the second vent hole depending on whether an adult is seated on the seat or the child restraint system is installed on the seat.

In the vehicle according to the present invention, the second vent hole is provided at the airbag cushion to face the passenger to exhaust therethrough a gas introduced into the airbag cushion, and the vent amount adjustment member is connected to the second vent hole to adjust the amount of gas exhausted through the second vent hole depending on whether an adult is seated or the child restraint system is installed on the seat. When an adult is seated on the seat, the inner pressure of the airbag cushion is adapted to be relatively high while when the child restraint system is installed on the seat, the inner pressure of the airbag cushion is adapted to be relatively low. By doing so, the adult may be protected under an appropriate inner pressure while an infant under age 1 or 6, or a child under age 6 may be prevented from being injured due to expansion of the airbag cushion.

DETAILED DESCRIPTION OF THE PREFERRED EMBODIMENTS

Exemplary embodiments of the present invention will be described in greater detail with reference to accompanying drawings.

Figure 1:
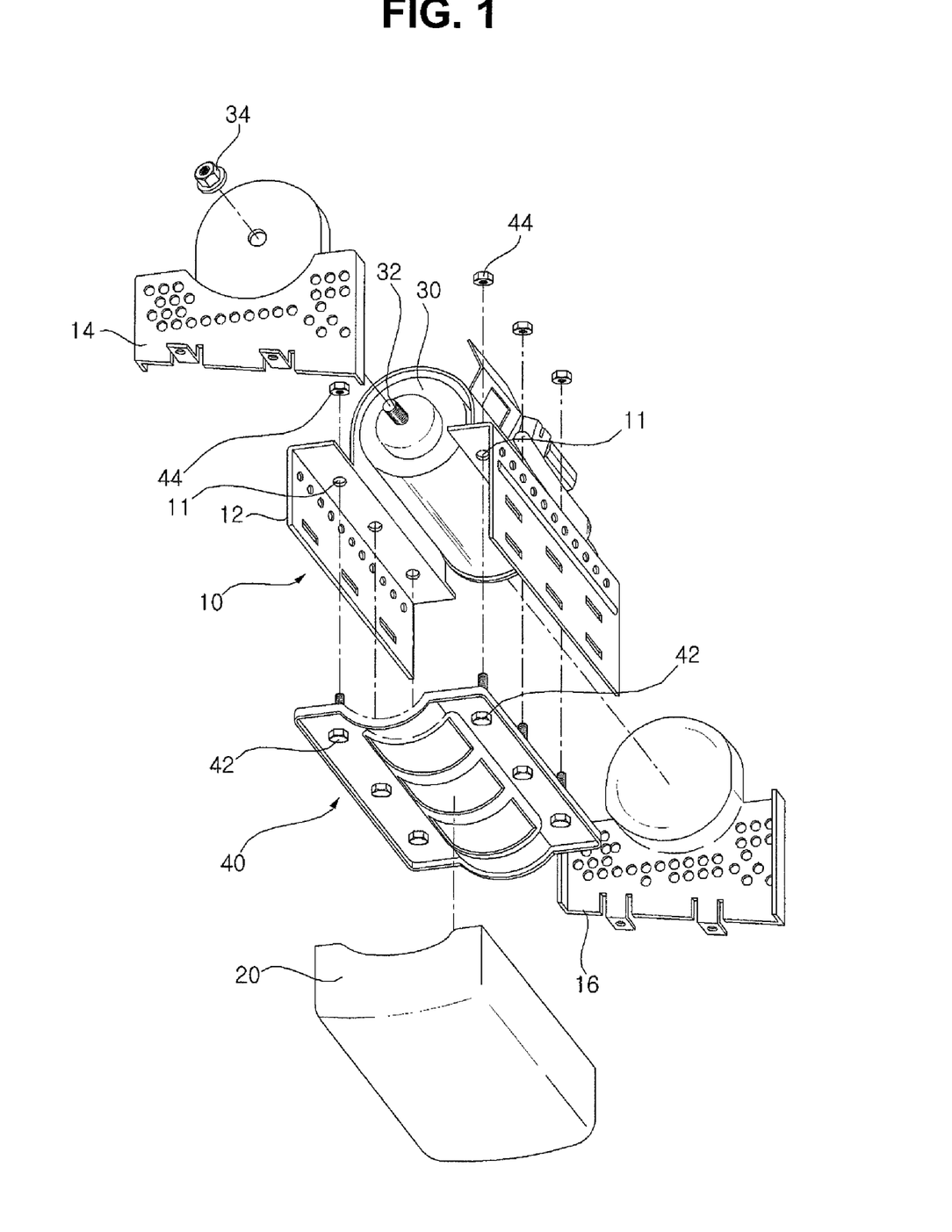
FIG. 1 is an exploded perspective view illustrating an airbag for passenger seat included in a vehicle according to a first exemplary embodiment.
Figure 2:
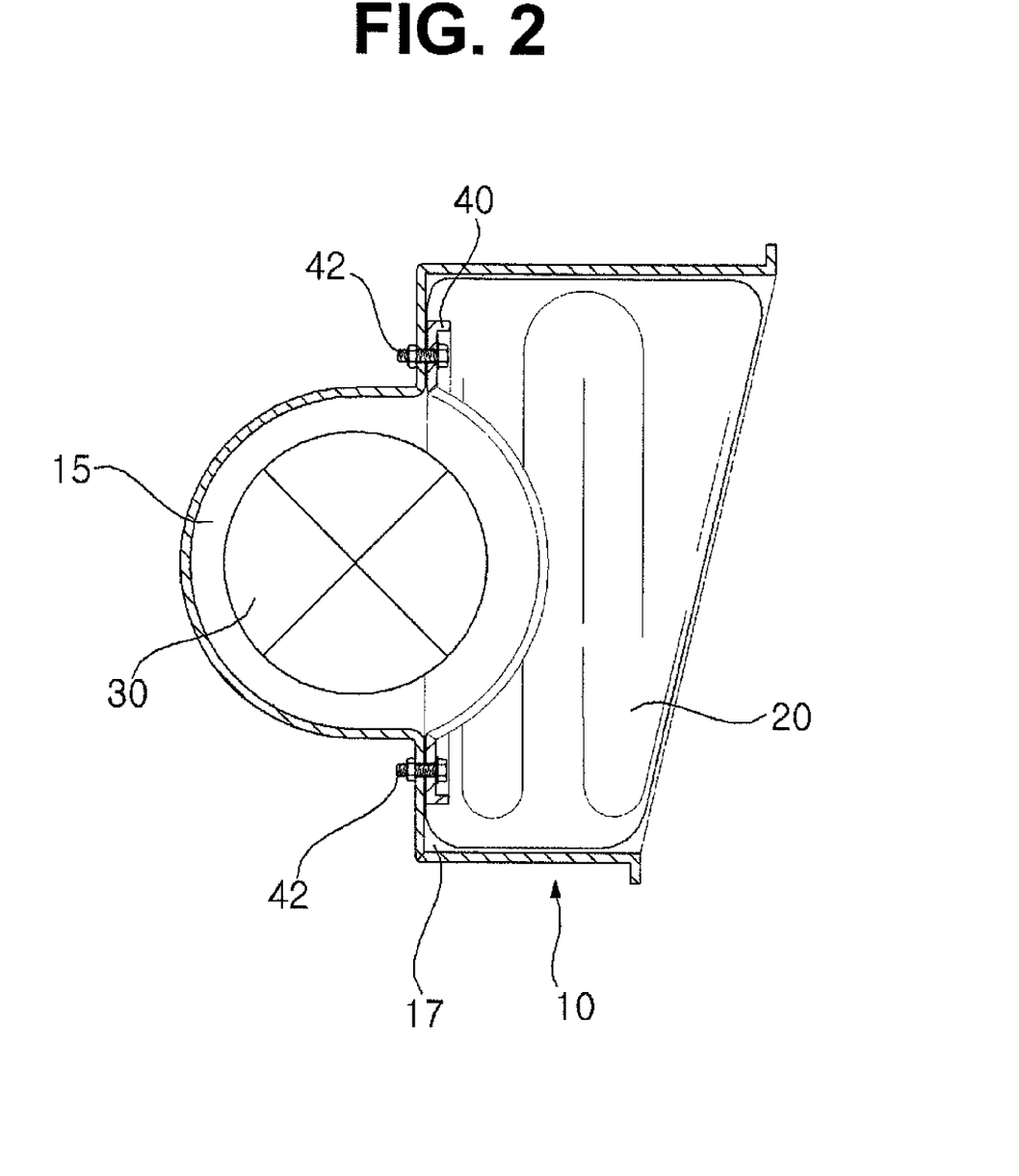
FIG. 2 is a side cross section view illustrating where the airbag shown in FIG. 1 is assembled.

FIG. 1 is an exploded perspective view illustrating an airbag for passenger seat included in a vehicle according to a first exemplary embodiment, and FIG. 2 is a side cross section view illustrating where the airbag shown in FIG. 1 is assembled.

Referring to FIGS. 1 and 2, an airbag for passenger seat (not shown) of the vehicle according to the first exemplary embodiment of the present invention is positioned at an upper side of a glove box that is opposite to the passenger seat.

The airbag for passenger seat includes an airbag housing 10, an airbag cushion accommodated in the airbag housing 10, and inflator 30 that introduces a gas into the airbag cushion 20 so that the airbag cushion 20 may be expanded.

More specifically, the airbag housing 10 includes a housing body 12 whose top, and left and right surfaces are open, and a pair of side caps 14 and 16 that are provided at the left and right surfaces of the housing body 12, respectively.

The side caps 14 and 16 may be coupled with the housing body 12 by welding.

Further, the airbag housing 10 has a mounting space 15 at its lower part for mounting the inflator 30 therein, and a receiving space 17 at its upper part for receiving the airbag cushion 20 therein.

A screw part 32 is protruded from a side surface of the inflator 30. The screw part 32 is screw-coupled with a nut 32 via the cap 14, with the inflator 30 received in the mounting space 15 of the airbag housing 10, so that the inflator 30 is fixed to the airbag housing 10.

The inflator 30 introduces a gas into the airbag cushion 20. The gas may be generated by an explosion of a gas generation material contained in the inflator 30.

The airbag cushion 20 is folded and received in the receiving space 17 of the airbag housing 10, and connected to the inflator 30. The airbag cushion 20 is expanded when a gas flows from the inflator 30 into the airbag cushion 20, thus protecting a passenger seated on the passenger seat.

A cushion retainer 40 is arranged between the airbag housing 10 and the airbag cushion 20. The cushion retainer 40 is connected to the airbag housing 10 to support the airbag cushion 20.

The cushion retainer 40 has a plurality of bolts for coupling between the cushion retainer 40 and the housing body 12. The housing body 12 has a plurality of bolt holes 11 through which the counterpart bolts 42 pass. The bolts 42 passing through the bolt holes 11 are fastened by the nuts 44, so that the cushion retainer 40 is coupled with the airbag housing 10.

Figure 3:
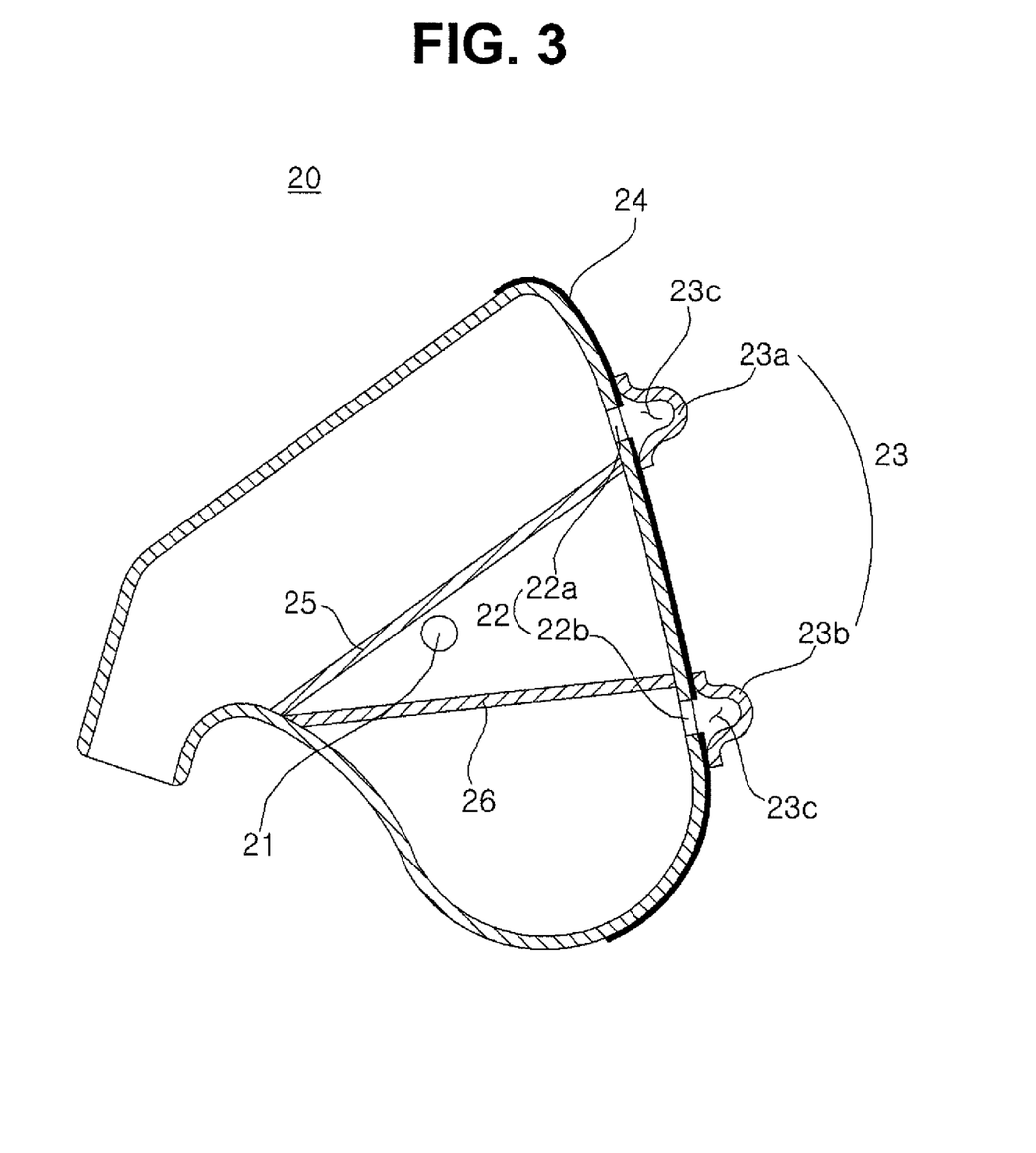
FIG. 3 is a side cross section view illustrating where the airbag cushion shown in FIGS. 1 and 2 is expanded.
Figure 4:
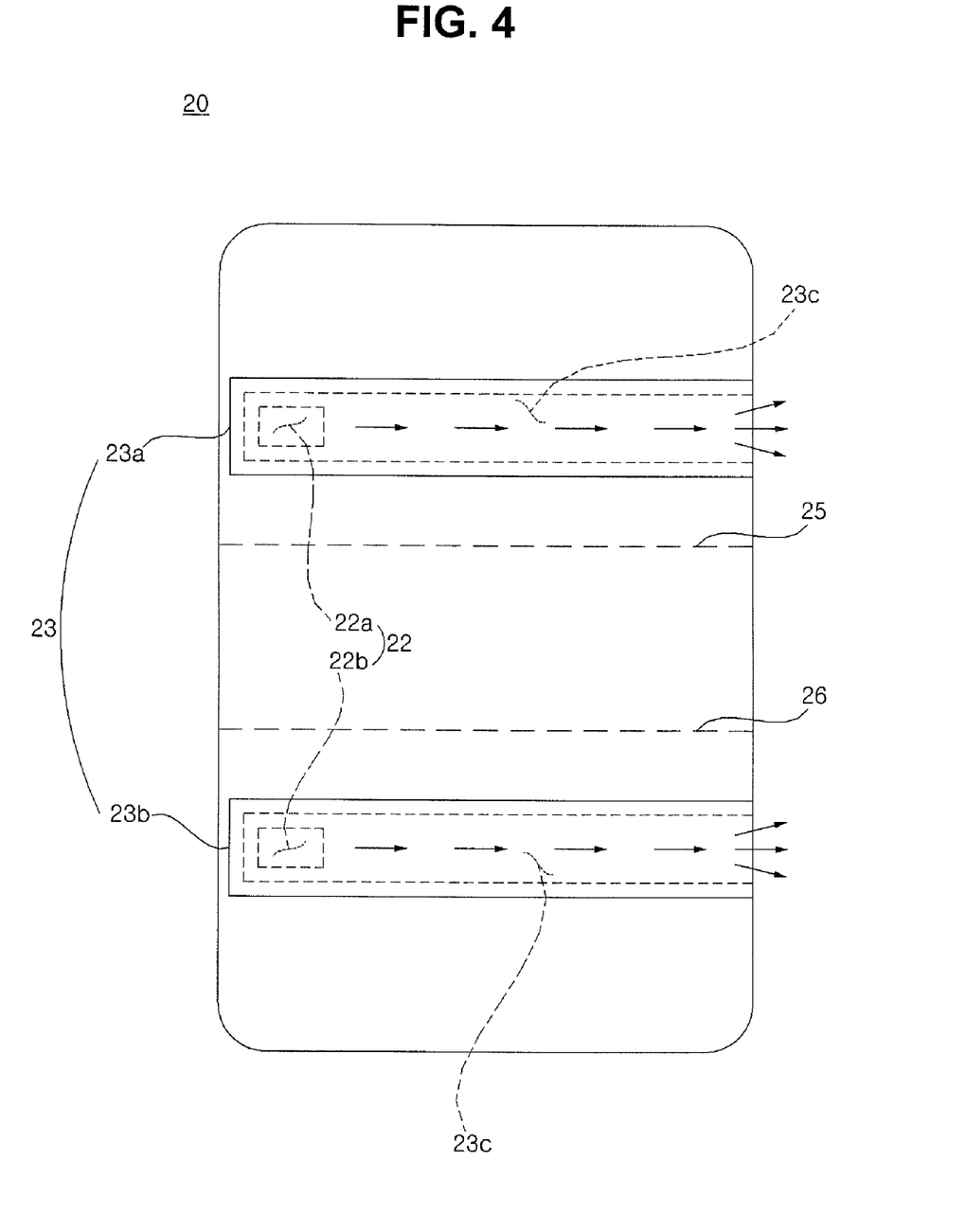
FIG. 4 is a front view illustrating the airbag cushion shown in FIG. 3.

FIG. 3 is a side cross section view illustrating where the airbag cushion shown in FIGS. 1 and 2 is expanded, and FIG. 4 is a front view illustrating the airbag cushion shown in FIG. 3

Referring to FIGS. 1 to 4, the airbag cushion 20 includes a first vent hole 21 and a second vent hole 22 through which a gas introduced from the inflator 30 is exhausted to protect a passenger seated on the passenger seat under an appropriate inner pressure. That is, the inflator 30 generates gas whose volume is larger than the inner volume of the airbag cushion 20 so that the airbag cushion 20 may be sufficiently expanded. Accordingly, if the gas flowing from the inflator 30 remains in the airbag cushion 20 as it is, the inner pressure of the airbag cushion 20 is excessively increased to injure the passenger seated on the passenger seat. To prevent this, the first and second vent holes 21 and 22 are provided.

The first vent hole 21 is provided at a side surface of the airbag cushion 20 and the second vent hole 22 is provided at a front surface of the airbag cushion 20 to be opposite to the passenger seat.

Further, the airbag cushion 20 has a vent amount adjustment member 23 at its outer surface, which is connected to the second vent hole 22 to adjust the amount of gas exhausted from the second vent hole 22.

The vent amount adjustment member 23 is arranged to cover the second vent hole 22 at the front surface of the airbag cushion 20, and sewed onto to the airbag cushion 20 except for its right end, thus leading to a vent line 23c whose right end is open. That is, the vent line 23c communicates with the second vent hole 22 so that the gas is exhausted from the second vent hole 22 to the opened right end of the vent amount adjustment member 23 along the vent line 23c. The vent amount adjustment member 23 may be configured to be sewed onto the airbag cushion 20 except for its left end, so that the left end is opened. In this exemplary embodiment, it has been exemplified that the right end of the vent amount adjustment member 23 is open.

In a case where a person seated on the passenger seat is an adult, an expansion of the airbag cushion 20 causes the adult to come in touch with the vent amount adjustment member 23, which in turn is pressed, thus blocking the vent line 23c. In this case, accordingly, the gas introduced from the inflator 30 to the airbag cushion 20 is firstly exhausted to the first vent hole 21 and the vent line 23c. When the vent amount adjustment member 23 comes in contact with the adult due to expansion of the airbag cushion 20, the vent line 23c is blocked and the airbag cushion 20 may be exhausted only through the first vent hole 21, thus maintaining such an appropriate inner pressure as may protect the adult seated on the passenger seat.

In a case where the person seated on the passenger seat is an infant under age 1 or 3, or a child under age 6, however, the infant or child may be injured if the inner pressure of the airbag cushion 20 is equal to that which is applied to an adult. In this case, thus, the inner pressure of the airbag cushion 20 should be adjusted lower than that for an adult.

An infant under 1 or 3, or a child under age 6 is generally seated on a child restraint system (not shown) installed on the passenger seat without being seated directly on the passenger seat.

The child restraint system is installed on a low part of the passenger seat. Accordingly, if the airbag cushion 20 is expanded, the vent amount adjustment member 23 does not come in touch with the child restraint system, so that the gas from the second vent hole 22 is exhausted to the opened right end of the vent amount adjustment member 23 along the vent line 23c. Since the gas is exhausted from the airbag cushion 20 through the first vent hole 21 and the vent line 23c, the inner pressure may be lowered in comparison with a case where an adult is seated on the passenger seat, thus allowing for an appropriate protection of the infant under age 1 or 3, or child under age 6.

At least one second vent hole 22 or vent amount adjustment member 23 may be provided on the front surface of the airbag cushion 20. In this exemplary embodiment, the descriptions will be limited to a case where two second vent holes 22 and two vent amount adjustment members 23 are provided on the front surface of the airbag cushion 20.

The second vent hole 22 includes an upper vent hole 22a positioned to face a head of the adult and a lower vent hole 22b positioned to a breast of the adult.

Further, the vent amount adjustment member 23 includes a first vent amount adjustment member 23a connected to the upper vent hole 22a and a second vent amount adjustment member 23b connected to the lower vent hole 22b.

Each of the first vent amount adjustment member 23a and the second vent amount adjustment member 23b has the vent line 23c that is sewed onto the airbag cushion 20 except for its right end for an opening. Further, the first vent amount adjustment member 23a may be configured so that its right end is open while the second vent amount adjustment member 23b may be configured so that its left end is open, and vice versa. In this exemplary embodiment, the descriptions will be limited to a case where both the first vent amount adjustment member 23a and the second vent amount adjustment member 23b have open right end.

The upper vent hole 22a and the lower vent hole 22b are provided one above the other in parallel with each other at the same position on the airbag cushion 20. Moreover, the upper vent hole 22a and the lower vent hole 22b may be positioned one above the other in parallel with each other but at different locations on the airbag cushion 20. Further, each of the upper vent hole 22a and the lower vent hole 22b may be provided in plurality along the vent line 23c. In this exemplary embodiment, however, the descriptions will be limited to a case where one upper vent hole 22a and one lower vent hole 22b are provided one above the other in parallel with each other at the same position on the airbag cushion 20.

Further, the upper vent hole 22a is adapted to have the same size as that of the lower vent hole 22b. And, the first vent amount adjustment member 23a is adapted to have the same size of opening as that of the second vent amount adjustment member 23b.

As configured above, the first vent amount adjustment member 23a prevents a gas released from the upper vent hole 22a when coming in touch with the head of the adult from being exhausted through the open right end, and the second vent amount adjustment member 23b prevents the gas released from the lower vent hole 22b when coming in touch with the breast of the adult from being exhausted through the open right end.

If the child restraint system is installed on the passenger seat, neither of the first vent adjustment 23a nor the second vent amount adjustment member 23b comes in touch with the child restraint system. Accordingly, gas released from the second vent hole 22 is exhausted through the open right ends of the first vent amount adjustment member 23a and the second vent amount adjustment member 23b. Further, if the child restraint system is installed on the passenger seat, the inner pressure of the airbag cushion 20 may be lowered in comparison with a case where an adult is seated on the passenger seat as long as at least one of the first vent amount adjustment member 23a and the second vent amount adjustment member 23b does not come in touch with the child restraint system.

Meanwhile, since the airbag cushion 20 has the first vent hole 21 and the second vent hole 22, gas flowed from the inflator 30 may be excessively exhausted through the first vent hole 21 and the second vent hole 22, causing lack of the inner pressure of the airbag cushion 20. To prevent this, the airbag cushion 20 further has a silicon-laminated layer 24 on the front surface thereof.

Since the airbag cushion 20 is made of fabric, gas flowed from the inflator 30 into the airbag cushion 20 may leak through minute clearances of the airbag cushion 20. The silicon-laminated layer 24 may prevent the leakage of the gas through the clearances to maintain the inner pressure of the airbag cushion 20 at a sufficient level without raising the capacity of the inflator 30 even though the airbag cushion 20 is provided with the first vent hole 21 and the second vent hole 22.

Further, a first tether 25 and a second tether 26 are arranged inside the airbag cushion 20 to maintain the shape of the airbag cushion 20 when expanded.

The rear ends of the first tether 25 and the second tether 26 meet each other and sew to the rear surface of the airbag cushion 20. Further, the interval between the first tether 25 and the second tether 26 is broadened as goes to the front surface of the airbag cushion 20, and the front ends of the first tether 25 and the second tether 26 are sewed to the front surface of the airbag cushion 20.

The front end of the first tether 25 is sewed to the lower end of the upper vent hole 22a and the front end of the second tether 26 is sewed to the upper end of the lower vent hole 22b. Therefore, the first tether 25 and the second tether 26 are positioned under the upper vent hole 22a but above the lower vent hole 22b.

The airbag cushion 20 according to the present invention may be modified in a number of exemplary embodiments by varying the number or size of the upper vent hole 22a and the lower vent hole 22b, and the size of opening of the first vent amount adjustment member 23a and the second vent amount adjustment member 23b. Variations to the airbag cushion 20 according to the present invention will now be described.

Figure 5:
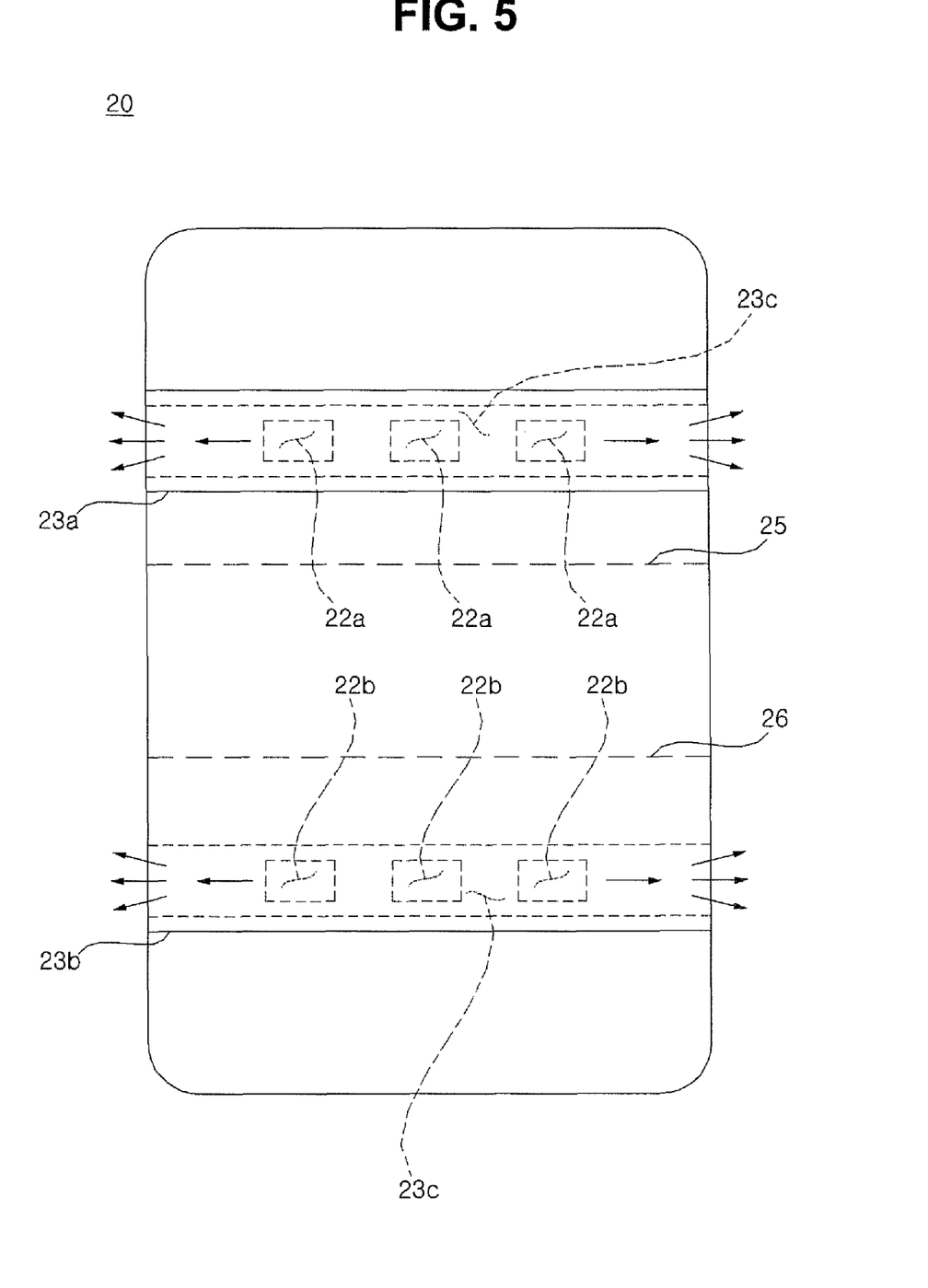
FIG. 5 is a front view illustrating an airbag cushion included in a vehicle according to a second exemplary embodiment.

FIG. 5 is a front view illustrating an airbag cushion included in a vehicle according to a second exemplary embodiment. The same components as those in the above embodiment will not be repeatedly described, and the same reference numerals refer to the same components.

Referring to FIG. 5, the airbag cushion 20 according to the second exemplary embodiment of the present invention is different from that according to the first exemplary embodiment in that each of the upper vent hole 22a and the lower vent hole 22b is provided in plurality on the airbag cushion 20, and the first vent amount adjustment member 23a and the second vent amount adjustment member 23b are sewed to the airbag cushion 20 except for the left and right ends, thus leading to vent lines 23c whose left and right ends are open.

It can be understood that the number of the upper vent hole 22a may be one and the first adjustment member 23a may be open only at one of the left and right ends, while only one lower vent hole 22b is provided and the second vent amount adjustment member 23b may be open only at one of the left and right ends. The description of this exemplary embodiment will be limited to a case where the upper vent hole 22a and the lower vent hole 22b are provided in plurality and the first vent amount adjustment member 23a and the second vent amount adjustment member 23b are open at both left and right ends thereof.

By configuring as above, when in touch with an adult, the first vent amount adjustment member 23a and the second adjustment member 23b are pressed so that the amount of gas exhausted through the open left and right ends may be locally adjusted.

Figure 6:
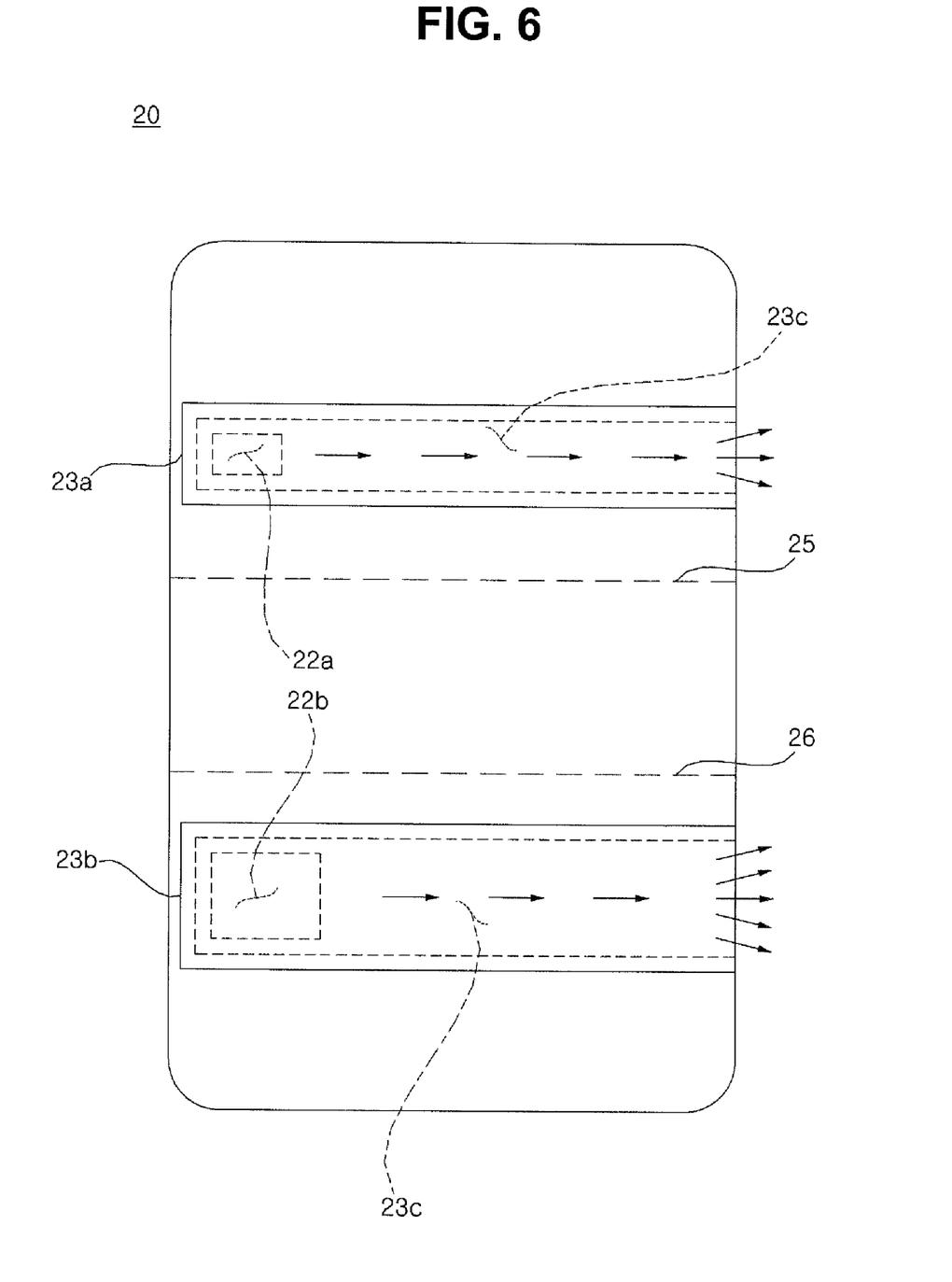
FIG. 6 is a front view illustrating an airbag cushion included in a vehicle according to a third exemplary embodiment.

FIG. 6 is a front view illustrating an airbag cushion included in a vehicle according to a third exemplary embodiment. The same components as those in the above embodiments will not be repeatedly described, and the same reference numerals refer to the same components.

Referring to FIG. 6, the airbag cushion 20 according to the third exemplary embodiment of the present invention is different from that according to the above exemplary embodiments in that the upper vent hole 22a is adapted to be smaller than the lower vent hole 22b. However, the upper vent hole 22a may be adapted to be larger than the lower vent hole 22b. In this exemplary embodiment, the descriptions will be limited to a case where the upper vent hole 22a is smaller than the lower vent hole 22b.

Further, the first vent amount adjustment member 23a is adapted to be smaller than the second vent amount adjustment member 23b. However, the first vent amount adjustment member 23a may be larger than the second vent amount adjustment member 23b. In this exemplary embodiment, the descriptions will be limited to a case where the first vent amount adjustment member 23a is smaller than the second vent amount adjustment member 23b.

As the second vent amount adjustment member 23b is adapted to be smaller than the first vent amount adjustment member 23a, the vent line 23c communicating with the lower vent hole 22b is adapted to be larger than the vent line 23c communicating with the upper vent hole 22a. The opening of the second vent amount adjustment member 23b is adapted to be larger than the opening of the first vent amount adjustment member 23a.

As described above, the inner pressure of the airbag cushion 20 may be locally adjusted by making the upper vent hole 22a and the opening of the first vent amount adjustment member 23a different in size from the lower vent hole 22b and the opening of the second vent amount adjustment member 23b, respectively.

The operation of the vehicle according to the exemplary embodiments of the present invention as configured above will now be described with reference to FIGS. 1 to 4.

To begin with, if a vehicle crash occurs, a gas generation material contained in the inflator 30 explodes to generate a gas, which in turn flows in the airbag cushion 20.

The flowed-in gas causes the airbag cushion 20 to be expanded toward the passenger seat, and then exhausted through the first vent hole 21, the upper vent hole 22a, and the lower vent hole 22b.

If an adult is seated on the passenger seat, the first vent amount adjustment member 23a and the second vent amount adjustment member 23b come in touch with his/her head and breast, respectively, thus being pressed.

The gas exhausted through the upper vent hole 22a and the lower vent hole 22b travels along the vent lines 23c and then is blocked by the parts of the first vent amount adjustment member 23a and the second vent amount adjustment member 23b, which are touched by the adult, thus failing to be exhausted to the exterior.

That is, in a case where an adult is seated on the passenger seat, the gas introduced in the airbag cushion 20 may be exhausted only through the first vent hole 21 but not the vent lines 23c communicating with the upper vent hole 22a and the lower vent hole 22b, whereby the airbag cushion 20 may maintain such an appropriate inner pressure as may protect the adult.

On the other hand, in a case where the child restraint system is installed on the passenger seat, when the airbag cushion 20 is expanded, the first vent amount adjustment member 23a and the second vent amount adjustment member 23b do not come in touch with the child restraint system, and thus, the gas is exhausted from the upper vent hole 22a and the lower vent hole 22b through the vent lines 23c to the openings of the first vent amount adjustment member 23a and the second vent amount adjustment member 23b.

Accordingly, since the gas introduced into the airbag cushion 20 is exhausted through the first vent hole 21 and the vent lines 23c communicating with the upper vent hole 22a and the lower vent hole 22b, the inner pressure of the airbag cushion 20 may be lowered in comparison with a case where an adult is seated on the passenger seat, thus maintaining such an appropriate inner pressure as may protect an infant under age 3 or a child under age 6.

In the vehicle according to the exemplary embodiments as described above, when an adult is seated on the passenger seat, the inner pressure of the airbag cushion 20 is adapted to be relatively high while the inner pressure of the airbag cushion 20 is adapted to be relatively lower when the child restraint system is installed on the passenger seat. By doing so, the adult may be protected under an appropriate inner pressure while an infant under age 3 or a child under age 6 may be prevented from being injured by expansion of the airbag cushion 20.

The foregoing embodiments and advantages are merely exemplary and are not to be construed as limiting the present document. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112(6).

What is claimed is:

1. A vehicle comprising:
a seat on which a passenger may be, seated;
an airbag cushion that is expanded according to an inflow of a gas to protect the passenger seated on the seat;
an inflator that introduces the gas into the airbag cushion;
a first vent hole provided at the airbag cushion to exhaust therethrough the gas introduced from the inflator;
a second vent hole provided at the airbag cushion to face the passenger to exhaust therethrough the gas introduced from the inflator; and
a vent amount adjustment member connected to the second vent hole to adjust the amount of the gas exhausted through the second vent hole depending on whether at least one of an adult is seated on the seat and a child restraint system is installed on the seat,
wherein the second vent hole includes an upper vent hole positioned to face a head of the adult and a lower vent hole positioned to face a breast of the adult, wherein the vent amount adjustment member includes a first vent amount adjustment member connected to the upper vent hole and a second vent amount adjustment member connected to the lower vent hole,
wherein the upper vent hole and the lower vent hole are different in size from each other.

2. The vehicle of claim 1, wherein the vent amount adjustment member is arranged on an outer surface of the airbag cushion.

3. The vehicle of claim 1, wherein the vent amount adjustment member has an opening in at least one end thereof to exhaust the gas from the second vent hole to the exterior.

4. The vehicle of claim 1, wherein if the adult is seated on the seat, the first vent amount adjustment member and the second vent amount adjustment member come in contact with the adult to adjust the amount of the gas exhausted from the second vent hole, while if the child restraint system is installed on the seat, at least one of the first vent amount adjustment member and the second vent amount adjustment member does not come in contact with the child restraint system to adjust the amount of the gas exhausted from the second vent hole.

5. A vehicle comprising:
a seat on which a passenger may be seated;
an airbag cushion that is expanded according to an inflow of a gas to protect the passenger seated on the seat;
an inflator that introduces the gas into the airbag cushion;
a first vent hole provided at the airbag cushion to exhaust therethrough the gas introduced from the inflator;
a second vent hole provided at the airbag cushion to face the passenger to exhaust therethrough the gas introduced from the inflator; and
a vent amount adjustment member connected to the second vent hole to adjust the amount of the gas exhausted through the second vent hole depending on whether at least one of an adult is seated on the seat and a child restraint system is installed on the seat,
wherein the second vent hole includes an upper vent hole positioned to face a head of the adult and a lower vent hole positioned to face a breast of the adult, wherein the vent amount adjustment member includes a first vent amount adjustment member connected to the upper vent hole and a second vent amount adjustment member connected to the lower vent hole,
wherein the first vent amount adjustment member and the second vent amount adjustment member are different in width from each other.

6. The vehicle of claim 1, wherein the airbag cushion includes a silicon-laminated layer to prevent the gas introduced from the inflator from passing through the airbag cushion.

7. The vehicle of claim 1, wherein the first vent hole is provided at a side surface of the airbag cushion.

8. A vehicle comprising:
a seat on which a passenger may be seated;
an airbag cushion that is expanded according to an inflow of a gas to protect the passenger seated on the seat;
an inflator that introduces the gas into the airbag cushion;

a first vent hole provided at the airbag cushion to exhaust therethrough the gas introduced from the inflator;

a second vent hole provided at the airbag cushion to face the passenger to exhaust therethrough the gas introduced from the inflator; and a vent amount adjustment member connected to the second vent hole to adjust the amount of the gas exhausted through the second vent hole depending on whether at least one of an adult is seated on the seat and a child restraint system is installed on the seat, wherein the second vent hole includes an upper vent hole positioned to face a head of the adult and a lower vent hole positioned to face a breast of the adult, wherein the vent amount adjustment member includes a first vent amount adjustment member connected to the upper vent hole and a second vent amount adjustment member connected to the lower vent hole, wherein the airbag cushion further includes a first tether positioned at a lower location than the upper vent hole and a second tether positioned at an higher location than the lower vent hole.

* * * * *